(12) United States Patent
Gatton

(10) Patent No.: US 7,027,219 B2
(45) Date of Patent: Apr. 11, 2006

(54) METHOD AND SYSTEM FOR MIRROR TELESCOPE CONFIGURATION

(76) Inventor: Averell S. Gatton, 1244 Colonial Rd., McLean, VA (US) 22101

( * ) Notice: Subject to any disclaimer, the term of this patent is extended or adjusted under 35 U.S.C. 154(b) by 0 days.

(21) Appl. No.: 10/356,526

(22) Filed: Feb. 3, 2003

(65) Prior Publication Data

US 2004/0150886 A1     Aug. 5, 2004

(51) Int. Cl.
*G02B 17/00*     (2006.01)
*G02B 5/08*     (2006.01)

(52) U.S. Cl. ............... 359/364; 359/365; 359/730; 359/857

(58) Field of Classification Search ........ 359/358–359, 359/363–366, 399–409, 429, 725–732, 850–861; 385/18–22

See application file for complete search history.

(56) References Cited

U.S. PATENT DOCUMENTS

| | | | | |
|---|---|---|---|---|
| 3,556,630 A | * | 1/1971 | Wilczynski | 359/9 |
| 4,245,895 A | * | 1/1981 | Wildenrotter | 359/848 |
| 4,337,437 A | * | 6/1982 | Hunter et al. | 359/349 |
| 4,696,554 A | * | 9/1987 | Seawright | 359/853 |
| 4,837,451 A | * | 6/1989 | Pinson | 250/208.1 |
| 5,132,836 A | * | 7/1992 | Fundingsland | 359/364 |
| 5,347,402 A | * | 9/1994 | Arbogast | 359/853 |
| 5,661,610 A | * | 8/1997 | Pasternak | 359/859 |
| 6,222,683 B1 | | 4/2001 | Hoogland et al. | 359/725 |
| 6,330,102 B1 | * | 12/2001 | Daneman et al. | 359/290 |
| 6,466,711 B1 | * | 10/2002 | Laor et al. | 385/18 |
| 6,487,334 B1 | * | 11/2002 | Ducellier et al. | 385/22 |
| 6,705,736 B1 | * | 3/2004 | Pressler | 359/853 |
| 6,836,381 B1 | * | 12/2004 | Giles et al. | 359/727 |

OTHER PUBLICATIONS

"Mirror Telescope" materials—present at Mar. 2002 Langley High School Science and Engineering Fair (4 pages).
Britannica aberration html page—printed Jan. 10, 2003 (2 pages).
Britannica optics html page—printed Jan. 10, 2003 (2 pages).
"Intel ISEF Official Abstract and Certification" form (submitted for Mar. 2002 Langley High School Science and Engineering Fair ) (1 page).
"Cerenkov Low Energy Sampling & Timing Experiment CELESTE," Henri Bergeret, et al., Celeste, general information, (Sep.1999) English translation (pp. 1&2); French article 4 pages including 1 drawing, (Sep. 1999).
"How STACEE works," Inside STACEE, pp. 1-9.
"Indirect Search for Dark Matter in M31 with the CELESTE Experiment," J. Lavalle, et al., EDP Sciences, Astronomy & Astrophysics, Jan. 11, 2006, pp. 1-8.
"Very high-energy γ-ray observations of the Crab nebula and other potential sources with the GRAAL experiment," F. Arqueros, et al., Astroparticle Physics, Jul. 31, 2001, pp. 293-318.

* cited by examiner

*Primary Examiner*—Thong Q Nguyen
(74) *Attorney, Agent, or Firm*—Hunton & Williams

(57) ABSTRACT

The invention provides a telescope system for inputting an image and presenting the image to a user. The telescope system includes a first array of flat mirrors including a plurality of first mirrors, the image, being light information, incident upon and reflected by each of the first array of mirrors; a primary reflecting curved mirror, each of the first mirrors reflecting light information onto the primary reflecting curved mirror; and a light collection portion, the light collection portion collecting and combining light information, originating from each of the first mirrors, so as to present a viewable image.

12 Claims, 5 Drawing Sheets

METHOD AND SYSTEM FOR MIRROR TELESCOPE CONFIGURATION

FIELD OF THE INVENTION

The invention relates generally to light collection, and specifically to a method and apparatus of using an array of mirrors for collecting light and for generating an image.

BACKGROUND OF THE INVENTION

There are a wide variety of known telescope arrangements. For example, telescopes may be categorized into two types including refractor and reflector telescopes. Reflector telescopes use mirrors to gather and focus light. The light collecting ability of a telescope is a function of the total amount of light collecting area, which for a reflecting telescope is the size of the mirror, or what is known as the telescope's "aperture." Magnification is a function of the eyepiece used in a telescope. In astronomical optics, various simplifying assumptions may be made in the construction of telescopes.

For example, the simplifying assumption may be made that all rays incident on the optics are parallel, and all angles are small. Further, various well established principles are used, such as Snell's law. Illustratively, Snell's law holds that the angle of incidence is equal to the angle of reflection. As is appreciated, there is a substantial understanding of the way in which light behaves in a reflective situation. Further, there is a substantial understanding of the refractive properties of light and the way light behaves when passing through a medium. Conventional telescopes use many of these known properties of light.

In conventional telescopes, the light gathering ability is determined by the area of the initial mirror, which is the primary focusing mirror. The initial mirror is curved to focus the light onto a single point. Then, the light is reflected onto a secondary mirror, which may or may not be a flat mirror, which is positioned in a slanted fashion in order for the light to be directed to an eye piece that allows the viewer to view the image which is represented by the incident light.

In reference to the prior art of FIG. 5, incident light 310, is directed to a primary mirror 320. The primary mirror is a concave mirror which reflects the incident light 310 to a secondary flat mirror 330. The secondary flat mirror 330, reflects the light onto an eye piece 340, for viewing the image, which is represented by the incident light. As shown in the telescope system of FIG. 5, the image is typically clearer when more light is collected. As a result, the area of the initial mirror 320, i.e., the concave mirror, is typically made larger with higher power telescopes. However, there is a limit on how large the initial concave mirror can be made. Further, the initial concave mirror increases in size, the cost also substantially increases.

The present invention overcomes the problems associated with the arrangement of FIG. 5, as well as other problems with known telescope arrangements.

SUMMARY OF THE INVENTION

In accordance with one embodiment, the present invention provides a technique for designing a telescope arrangement, having a mirror configuration with multiple flat mirrors. The multiple flat mirrors each reflect incident light onto a spherical curved primary mirror. In turn the invention provides two further arrays of mirrors that further manipulate the light reflected off the spherical primary mirror. These further arrays of mirrors collect and combine the light information so that the light is presented to a viewer through an eye piece.

To explain further, in the arrangement of the invention in accordance with one embodiment, a first set of flat mirrors receives light from a distant image, for example. This first set of flat mirrors reflects the incoming image onto the curved mirror. The arrangement effectively multiplies the amount of light collected by the curved mirror based on the number of flat mirrors, i.e., in effect the number of axes on which light is being collected. In accordance with one embodiment of the invention, a second array of flat mirrors is directionally oriented to reflect the light from the primary curved mirror in a fashion so as to cancel stretching of the image. A third array of mirrors, which may be collecting plates, is positioned to receive light from the second array of flat mirrors. The third array of mirrors directionally orients the light so as to correct for abstraction and to focus the light onto an eye piece. A user may then view the image through the eyepiece.

BRIEF DESCRIPTION OF THE DRAWINGS

The purpose and advantages of the present invention will be apparent to those of ordinary skill in the art from the following detailed description in conjunction with the attached drawings in which like reference characters are used to indicate like elements, and in which.

DETAILED DESCRIPTION OF THE INVENTION

The following description is intended to convey a thorough understanding of the invention by providing details involving light collecting techniques in accordance with embodiments of the invention. Various improvements and modifications to the embodiments described herein will be apparent to those skilled in the art, and the general principles defined herein may be applied to other embodiments. Therefore, the present invention is not limited to the specific embodiments shown and described, but interpreted to a larger scope consistent with the novel features disclosed herein.

Figure 1:
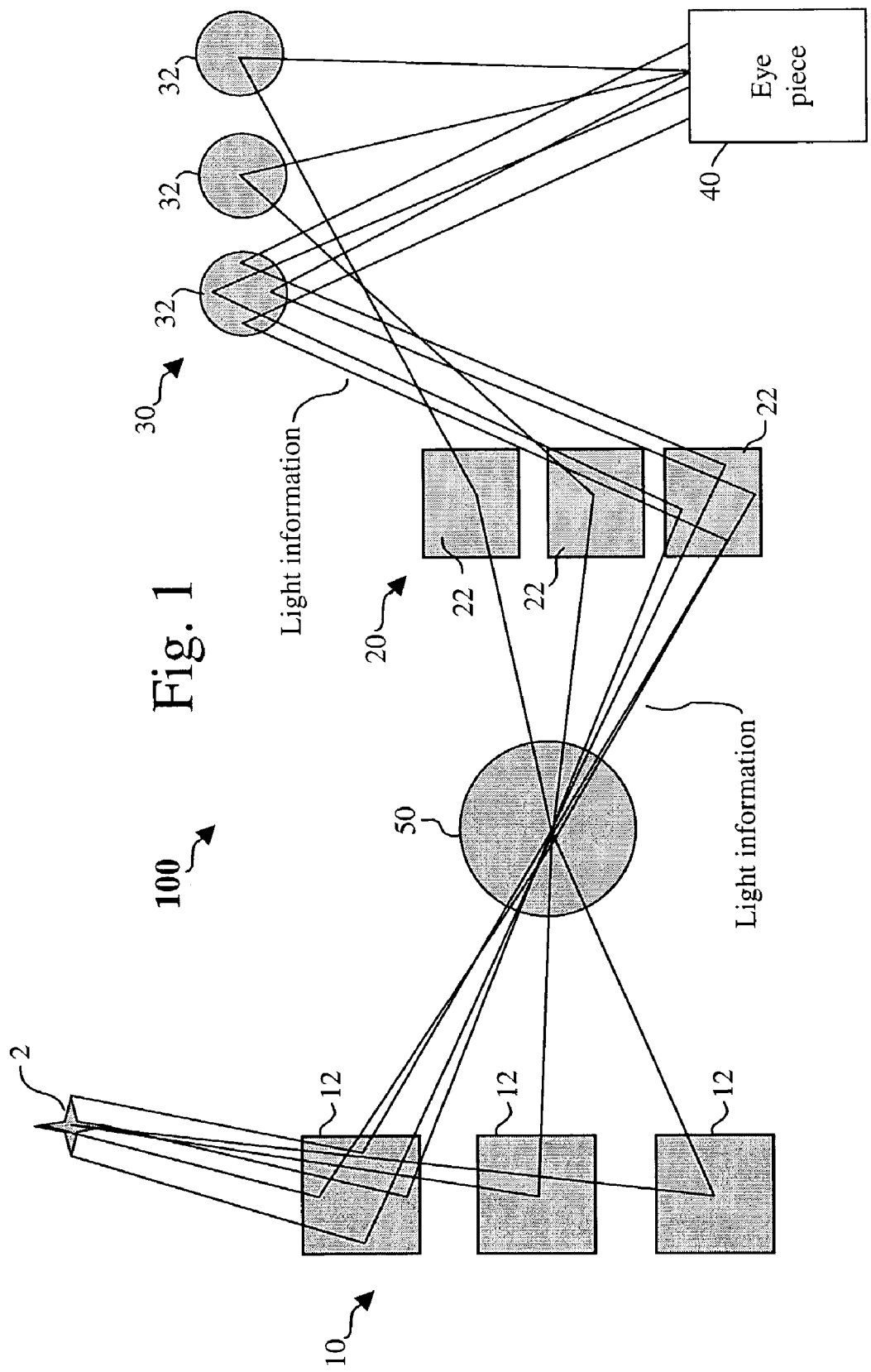
FIG. 1 is a top-view schematic block diagram of a telescope mirror arrangement in accordance with one embodiment of the invention.
Figure 2:
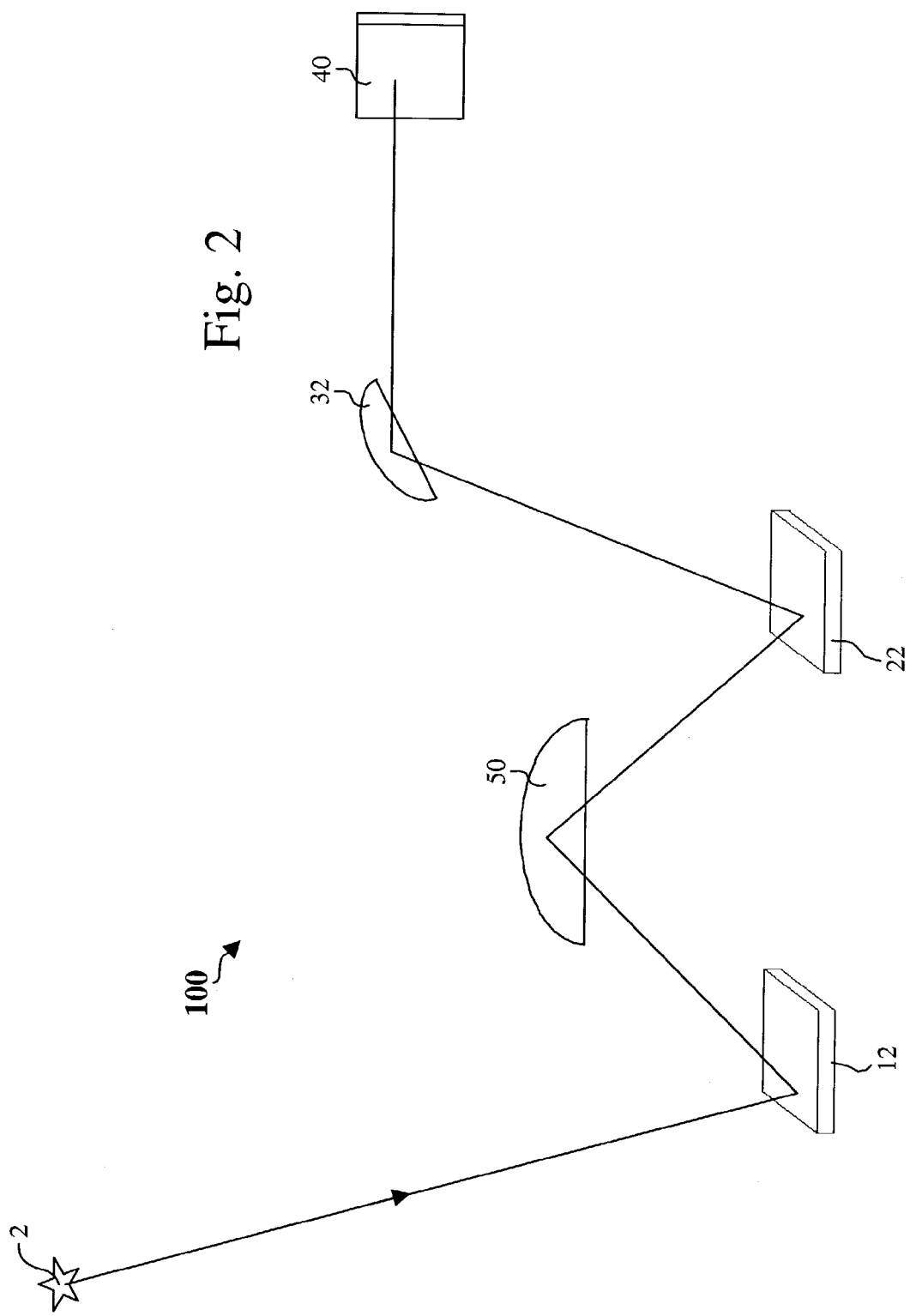
FIG. 2 is a side-view schematic block diagram of the mirror arrangement of FIG. 1 in accordance with one embodiment of the invention.

FIG. 1 is a top-view schematic block diagram of a telescope mirror arrangement 100 in accordance with one embodiment of the invention. FIG. 2 is a side-view schematic block diagram of a mirror arrangement in accordance with one embodiment of the invention. With reference to FIGS. 1 and 2, a light source 2 is shown. For example, the light source might be a star. The light emanating from the light source 2, i.e., a primary object to be viewed, is incident onto a first array of flat mirrors 10, respectively. That is, light is incident upon each of the mirrors 12 in the first array of flat mirrors 10.

The first array of flat mirrors 10 includes a plurality of flat mirrors 12 having the same construction. Each of the mirrors 12 are positioned to direct the incoming light onto the primary reflecting mirror 50. As a result, the amount of light collected is increased by each additional mirror 12 that is employed, i.e., so as to reflect light upon the primary reflecting mirror 50. Another way of thinking about the function of the first array of flat mirrors is to imagine a bugs eye, except that all the collected images will eventually be combined so as to be viewed in an intelligible fashion.

The primary reflecting mirror 50, in turn reflects light reflected from the first array of flat mirrors onto a second array of flat mirrors 20, which is composed of multiple mirrors 22. For every mirror 12 in the first array of flat mirrors, there exist a corresponding number of mirrors 22 in the second array of flat mirrors 20. The mirrors 22 performs correcting for stretching. Each of the mirrors 22 is directionally oriented in a way so as to reflect light from the primary reflecting mirror 50 onto a corresponding mirror 32, which is disposed in a third array of mirrors 30. The mirrors 32 numerically constitute the same number of mirrors as the second array of flat mirrors 20. The third array of flat mirrors 32 reflect the light onto an eye piece 40, so that the image represented by the light can be viewed by a user. It is noted that the primary reflecting mirror 50, which may be a curved or a parabolic mirror, in effect will create abstraction in the reflected light. Each mirror in the third array of mirrors may be a correcting plate, which corrects for such abstraction.

Accordingly, the invention provides a number of flat mirrors 12, which are positioned to direct the incoming light onto the primary curved reflecting mirror 50, on multiple focal axis, in order to increase the amount of collected light. The primary reflecting mirror 50, in turn reflects the light reflected from the first array of flat mirrors 10 onto a second array of flat mirrors 20, which is composed of multiple mirrors 22. The second array of mirrors are directionally oriented in a way so as to cancel the effects of expanding, lengthening or widening of the image. That is, such an effect is known as "stretching" and is created by the flatness of the first array of flat mirrors. The second array of mirrors 22, the third array of mirrors 32 and the eye piece 40 may be characterized as a "light collection portion."

Figure 3:
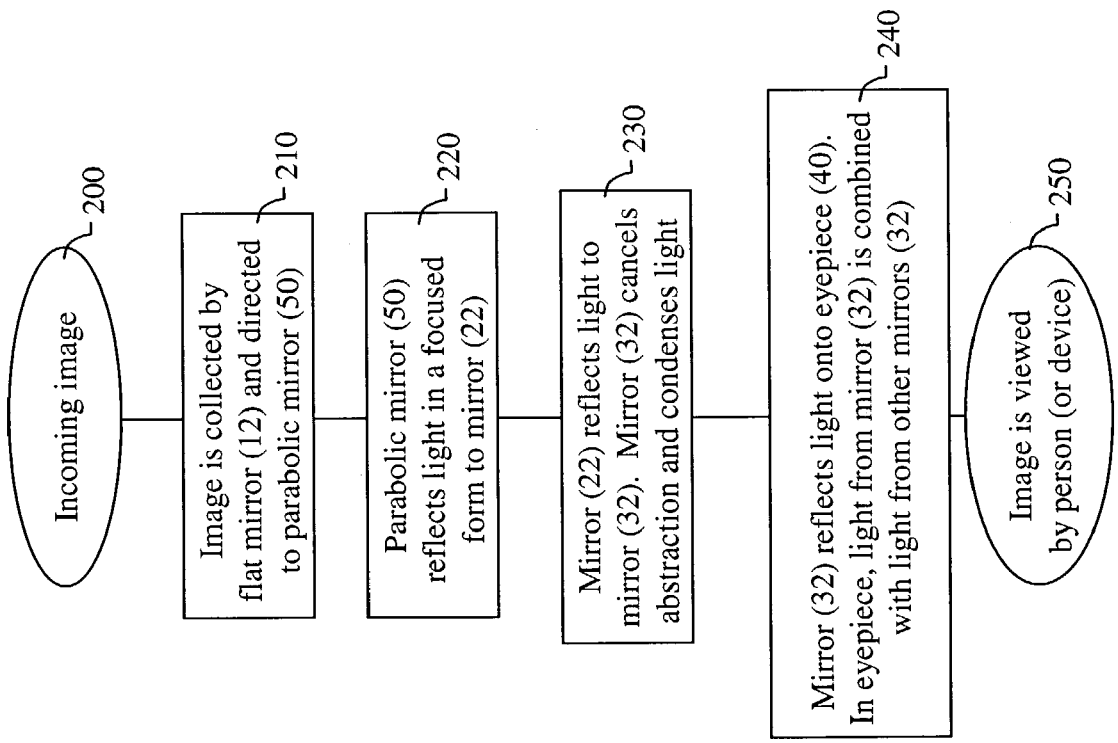
FIG. 3 is a flow chart showing the manipulation of light in the telescope arrangement of FIG. 1 in accordance with one embodiment of the invention.

FIG. 3 is a flowchart further illustrating the manipulation of light using the system of FIG. 1, in accordance with one embodiment of the invention. As shown in FIG. 3, the process is initiated by an incoming image in step 200. Then, in step 210, the incoming light is received. The received incoming light is collected by the first array of flat mirrors, which directs the light to a primary parabolic reflecting mirror. The primary parabolic reflecting mirror reflects the light in a focused form onto a second array of flat mirrors in step 220. The second array of flat mirrors is oriented in a way to cancel the stretching of the image. In step 230, the second array of mirrors reflects the more focused light onto a third array of mirrors. The third array of mirrors may be flat, curved or be a correcting plate which corrects abstraction. The third array of mirrors focuses the light onto an eye piece in step 240. In the eyepiece, the light that respectively originated from each mirror, i.e., mirror 12 for example, in the initial array of mirrors is combined. As a result, the image can be viewed in step 250.

As discussed above, there is a substantial understanding in the art of the properties of light and the way that light behaves when interacting with different mediums. For example, such properties of light include both reflective and refractive properties. It is appreciated that, given the above teaching of the present invention, it is within the purview of one of ordinary skill in the art to develop the necessary relationships between the various mirrors so as to manipulate the image as needed. It is further appreciated that a wide variety of known mathematical and geometrical models relating to the passage of light may used. That is, such models may be used so as to successfully reflect light from a mirror 12, onto the parabolic mirror 50, and thereafter onto mirrors 22 and 32, so as to impact upon the eyepiece 40, and importantly to be superimposed with the same image reflected from other mirrors 12. Further it is appreciated that very fine adjustments of the mirrors used in the invention will typically be necessary. These adjustments might well be done with the assistance of a computer.

Figure 4:
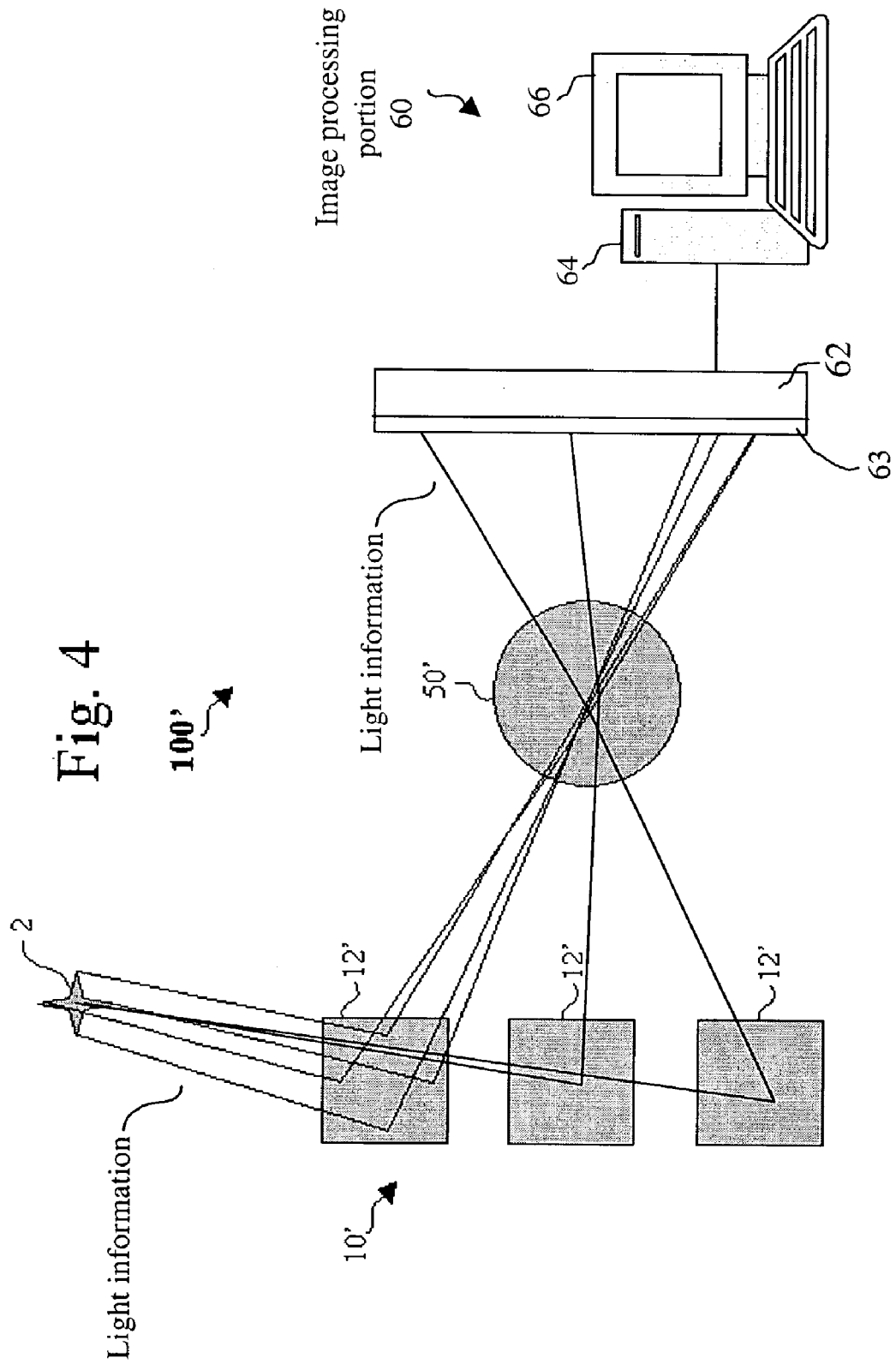
FIG. 4 is a top-view schematic block diagram of a telescope mirror arrangement including a computer system in accordance with another embodiment of the invention.
Figure 5:
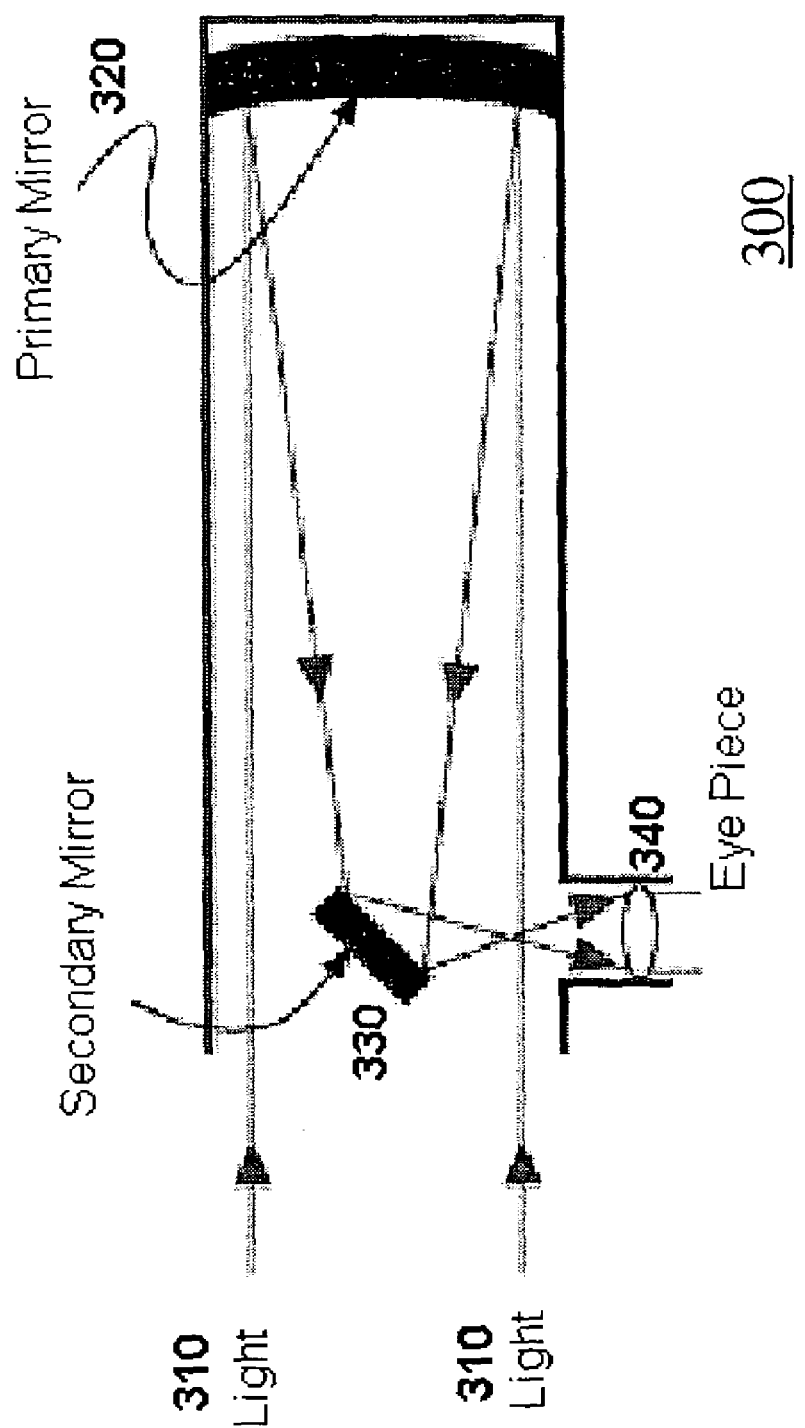
FIG. 5 is a schematic block diagram showing a Prior Art telescope arrangement.

In accordance with a further embodiment of the invention, FIG. 4 is a top-view schematic block diagram of a telescope mirror arrangement 100' in accordance with a further embodiment of the invention. The light emanating from the light source 2, i.e., a primary object to be viewed, is incident onto a first array of flat mirrors 10', respectively, in a similar manner as described above with reference to FIG. 1. That is, light is incident upon each of the mirrors 12' in the first array of flat mirrors 10.

The first array of flat mirrors 10' includes a plurality of flat mirrors 12' having the same construction. Each of the mirrors 12' are positioned to direct the incoming light onto the primary curved reflecting mirror 50'. As a result, the amount of light collected is increased by each additional mirror 12' that is employed, i.e., so as to reflect light upon the primary reflecting mirror 50. While three (3) mirrors are shown in FIG. 4, the number of mirrors may be varied as desired.

In accordance with the embodiment of FIG. 4, the light collection portion is an image processing portion 60. The image processing portion 60 includes an image input processing device 62, a computer system 64 and a monitor 66. In accordance with this embodiment of the invention, after light is reflected off the parabolic mirror 50, the light is collected by the image input processing portion 62, which includes a light sensitive portion 63. The image input processing portion 62 might be in the form of a photosensitive medium, a computer pixel array, or utilize digital camera technology, for example. The image input processing portion 62 collects light data based on "light information," i.e., the color and intensity of light for example, impinging upon the light sensitive portion 63 of the image input processing portion 62. This impinging light information may be converted to digital data, based on the light information and the particular x-y coordinate position of that light information on the light sensitive portion 63, in any of a wide variety of known techniques.

Once the impinging light information is converted to digital data in the image input processing portion 62, the data is output to the computer system 64. The computer system 64 processes the data so as to present a viewable representation of the object 2 using the monitor 66. To explain further, it is appreciated that the coordinate position of the light information, impinging upon the image input processing portion 62, may be determined based upon the geometrical relationship of the respective mirrors 12', the parabolic mirror 50', and the light sensitive portion 63. Accordingly, the computer system 64 can collect and combine the light information from the appropriate coordinate positions on the light sensitive medium 63. Further, it is appreciated that the digital data representing the light information may be processed by the computer system 64 to correct for abstraction, stretching or other degradations.

In further explanation of the invention, and in particular with reference to FIG. 1, as discussed above, there is a substantial understanding in the art of the properties of light and the way that light behaves when interacting with different mediums. For example, such properties of light include both reflective and refractive properties. It is appreciated that, given the above teaching of the present invention, it is within the purview of one of ordinary skill in the art to develop the necessary relationships between the various mirrors so as to manipulate the image as needed. It is further appreciated that a wide variety of known mathematical and geometrical models relating to the passage of light may used. That is, such models may be used so as to successfully reflect light from a mirror 12, onto the parabolic mirror 50, and thereafter onto mirrors 22 and 32, so as to impact upon the eyepiece 40, and importantly to be superimposed (on the eye piece 40) with the same image, which is obtained from other mirrors 12. Further it is appreciated that very fine adjustments of the mirrors used in the invention will typically be necessary. These adjustments might well be done with the assistance of a computer.

Further, it is appreciated that there is a substantial understanding in the art of the inputting and processing of images. Accordingly, it is appreciated that given the novel arrangement of FIG. 4, as described above, it would have been within the purview of one of ordinary skill in the art to understand how to obtain light data, based on light information reflected off the parabolic or curved mirror 50' onto the image input processing device 62, and process that light data so as to present the desired image to a person viewing the monitor 66.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A telescope system for forming an image of an object and presenting the image to a user, the telescope system including:
   a first array of flat mirrors including a plurality of first mirrors, the image being light information, the light information incident upon and reflected by each of the first array of mirrors;
   a primary reflecting curved mirror, each of the first mirrors reflecting light information onto the primary reflecting curved mirror; and
   a light collection portion, the light collection portion collecting and combining light information, originating from each of the first mirrors, so as to present a viewable image; and wherein the light collection portion includes:
   a second array of flat mirrors including a plurality of second mirrors, the primary reflecting curved mirror reflecting light information from each of the first mirrors to a corresponding second mirror;
   a third array of mirrors including a plurality of third mirrors, each of the second mirrors reflecting light information from the primary reflecting curved mirror to a corresponding third mirror; and
   an eye piece, each of the third mirrors reflecting light information from one of the second mirrors, which corresponds to one of the third mirrors, to the eyepiece so as to combine light information; and
   wherein the user can view the image in the eyepiece.

2. The telescope system of claim 1, wherein the third array of mirrors is each a correcting plate.

3. The telescope system of claim 2, wherein the second array of mirrors corrects for stretching of the image and the third array of mirrors corrects for abstraction.

4. The telescope system of claim 1, wherein each of the flat mirrors in the first array being flat in two-dimensions.

5. A method for constructing a telescope having a first array of flat mirrors, a primary reflecting curved mirror, a second array of flat mirrors, a third array of mirrors and an eye piece, the method including:
   positioning the first array of flat mirrors to reflect a light from an object being viewed onto the primary reflecting curved mirror;
   positioning the primary reflecting curved mirror to receive the light from the first array of flat mirrors on multiple focal axis;
   positioning the second array of flat mirrors to receive the light from the primary reflecting curved mirror;
   positioning a third array of mirrors to receive the light from the second array of flat mirrors; and
   positioning an eye piece to receive the light from the third array of mirrors.

6. The method of claim 5 wherein, in the step of positioning the first array of flat mirrors, the light is reflected on multiple focal axis.

7. The method of claim 6 wherein the step of positioning the third array of mirrors includes orienting the mirrors so as to correct for abstraction.

8. The method of claim 6 wherein the step of positioning said second array of flat mirrors, requires positioning the same number of flat mirrors as are in the first array of flat mirrors.

9. The method of claim 5 wherein, the step of positioning said second array of flat mirrors includes orienting the mirrors so as to cancel stretching of the image.

10. The method of claim 9 wherein, the step of positioning the second array of flat mirrors, requires positioning the same number of flat mirrors as are in the first array of flat mirrors.

11. The method of claim 10 wherein the step of positioning the third array of mirrors includes orienting each mirror in the third array of mirrors so as to focus the light onto the eye piece.

12. A telescope system for forming an image of an object and presenting the image to a user, the telescope system including:
   a first array of flat mirrors including a plurality of first mirrors, light containing the image being incident upon and reflected by each of the first mirrors;

a primary reflecting curved mirror, each of the first mirrors reflecting the light to the primary reflecting curved mirror;

a second array of flat mirrors including a plurality of second mirrors, the primary reflecting curved mirror reflecting the light from each of the first mirrors to a corresponding second mirror;

a third array of mirrors including a plurality of third mirrors, each of the second mirrors reflecting the light from the primary reflecting curved mirror to a corresponding third mirror, each of the third mirrors being a correcting plate; and an eye piece, each of the third minors reflecting the light from a second mirror, which corresponds to one of the third mirrors, to the eyepiece; and wherein the user can view the image generated from the light in the eyepiece.

* * * * *